US012570292B2

(12) United States Patent　　(10) Patent No.:　US 12,570,292 B2
Kogure　　　　　　　　　　　　　(45) Date of Patent:　Mar. 10, 2026

(54) CONTROL DEVICE FOR VEHICLE

(71) Applicant: TOYOTA JIDOSHA KABUSHIKI KAISHA, Toyota (JP)

(72) Inventor: Takayuki Kogure, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/986,743

(22) Filed: Dec. 19, 2024

(65) Prior Publication Data

US 2025/0289436 A1　　Sep. 18, 2025

(30) Foreign Application Priority Data

Mar. 15, 2024　(JP) ................................. 2024-041721

(51) Int. Cl.
　　*B60W 30/182* 　(2020.01)
　　*B60W 10/04* 　(2006.01)
　　*B60W 10/115* 　(2012.01)
　　*B60W 30/045* 　(2012.01)
　　*B60W 30/18* 　(2012.01)

(52) U.S. Cl.
　　CPC .......... *B60W 30/182* (2013.01); *B60W 10/04* (2013.01); *B60W 10/115* (2013.01); *B60W 30/045* (2013.01); *B60W 30/18172* (2013.01); *B60W 2510/0657* (2013.01); *B60W 2510/107* (2013.01); *B60W 2520/10* (2013.01); *B60W 2520/20* (2013.01); *B60W 2540/10* (2013.01); *B60W 2710/1005* (2013.01)

(58) Field of Classification Search
　　CPC ............. B60W 30/182; B60W 30/045; B60W 30/18172; B60W 10/115; B60W 10/11;

B60W 10/04; B60W 10/06; B60W 10/08; B60W 2510/0657; B60W 2520/10; B60W 2520/20; B60W 2540/10; B60W 2510/107; B60W 2710/1005; B60W 2710/0666; B60W 2710/083
USPC .................................... 701/54; 477/111, 113
See application file for complete search history.

(56) References Cited

U.S. PATENT DOCUMENTS

| | | | | |
|---|---|---|---|---|
| 2010/0191434 A1* | 7/2010 | Fujita | ...................... | B60T 8/175 |
| | | | | 701/91 |
| 2018/0257631 A1* | 9/2018 | Fodor | ................... | B60W 10/18 |

FOREIGN PATENT DOCUMENTS

JP　　　　2023-157456 A　　10/2023

* cited by examiner

*Primary Examiner* — Roger L Pang
(74) *Attorney, Agent, or Firm* — SoraIP, Inc.

(57) ABSTRACT

When the shift position of the automatic transmission is the forward traveling position, it is determined that the sport traveling is being performed, and when it is determined that the permission condition is satisfied, the automatic transmission is downshifted. Thus, the downshift is performed during the execution of the sport running, and the driving torque is easily secured. Further, since the present disclosure is limited to the case where the permission condition is satisfied, for example, the downshift is not executed in a state in which the sideslip suppression control is activated. Therefore, it is possible to easily secure the driving torque while suppressing an unnecessary downshift when the sport travel is executed. It is easy to control the vehicle attitude during the execution of the sport running. In addition, the acceleration performance of the rising edge after the turning is improved.

5 Claims, 3 Drawing Sheets

WH:14, 15

CONTROL DEVICE FOR VEHICLE

CROSS-REFERENCE TO RELATED APPLICATION

This application claims priority to Japanese Patent Application No. 2024-041721 filed on Mar. 15, 2024, incorporated herein by reference in its entirety.

BACKGROUND

1. Technical Field

The present disclosure relates to a control device for a vehicle that executes control during sports travel in which the vehicle is caused to travel in a sideslip state during a turn.

2. Description of Related Art

A control device for a vehicle including a power source and an automatic transmission provided in a power transfer path between the power source and drive wheels is well known. For example, Japanese Unexamined Patent Application Publication No. 2023-157456 (JP 2023-157456 A) describes such a control device for a vehicle. JP 2023-157456 A indicates that a downshift is executed when rapid deceleration is requested in a vehicle including an engine and a stepped transmission mechanism.

SUMMARY

With reference to the technique described in JP 2023-157456 A, it is possible to form a gear stage on the low vehicle speed side by executing a downshift during strong braking before entering a corner. On the other hand, in some cases, the vehicle speed and the engine rotational speed are lowered to a low range during the execution of sports travel in which the vehicle is caused to travel in a sideslip state during a turn. In this case, there is a possibility that a downshift is not performed since a range in which it is determined to perform a downshift is not entered, depending on the travel state during the execution of the sports travel. Then, the drive wheels may grip due to insufficient drive torque or the like, and the vehicle attitude may not be maintained well in the sideslip state, for example, during the execution of the sports travel. Meanwhile, after the turn, acceleration is performed from a state in which the drive torque is insufficient, and therefore re-acceleration may be slow.

The present disclosure has been made in view of the above circumstances, and an object of the present disclosure is to provide a control device for a vehicle capable of easily securing drive torque while suppressing an unnecessary downshift when executing sports travel.

A first aspect of the present disclosure provides a control device for a vehicle including a power source and an automatic transmission provided in a power transfer path between the power source and drive wheels, including:

a sports travel determination unit that determines whether sports travel in which the vehicle is caused to travel in a sideslip state during a turn is being executed;

a condition establishment determination unit that determines whether a permission condition that a vehicle speed is less than a predetermined vehicle speed and that operation of sideslip suppression control is restricted is established; and a transmission control unit that executes a downshift of the automatic transmission when a shift position of the automatic transmission is a forward travel position that enables forward travel by executing automatic shift control, and when it is determined that the sports travel is being executed and it is determined that the permission condition is established.

According to the first aspect of the present disclosure, a downshift of the automatic transmission is executed when the shift position of the automatic transmission is the forward travel position, and when it is determined that the sport travel is being executed and it is determined that the permission condition is established. Consequently, the downshift is executed during the execution of the sports travel, and the drive torque is easily secured. Further, since the downshift is executed only when the permission condition is established, the downshift is not executed in a state in which sideslip suppression control is activated, for example. Therefore, it is possible to easily secure drive torque while suppressing an unnecessary downshift when executing the sports travel. It is easy to control the vehicle attitude during the execution of the sports travel. In addition, the acceleration performance after a turn is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings.

Figure 1:
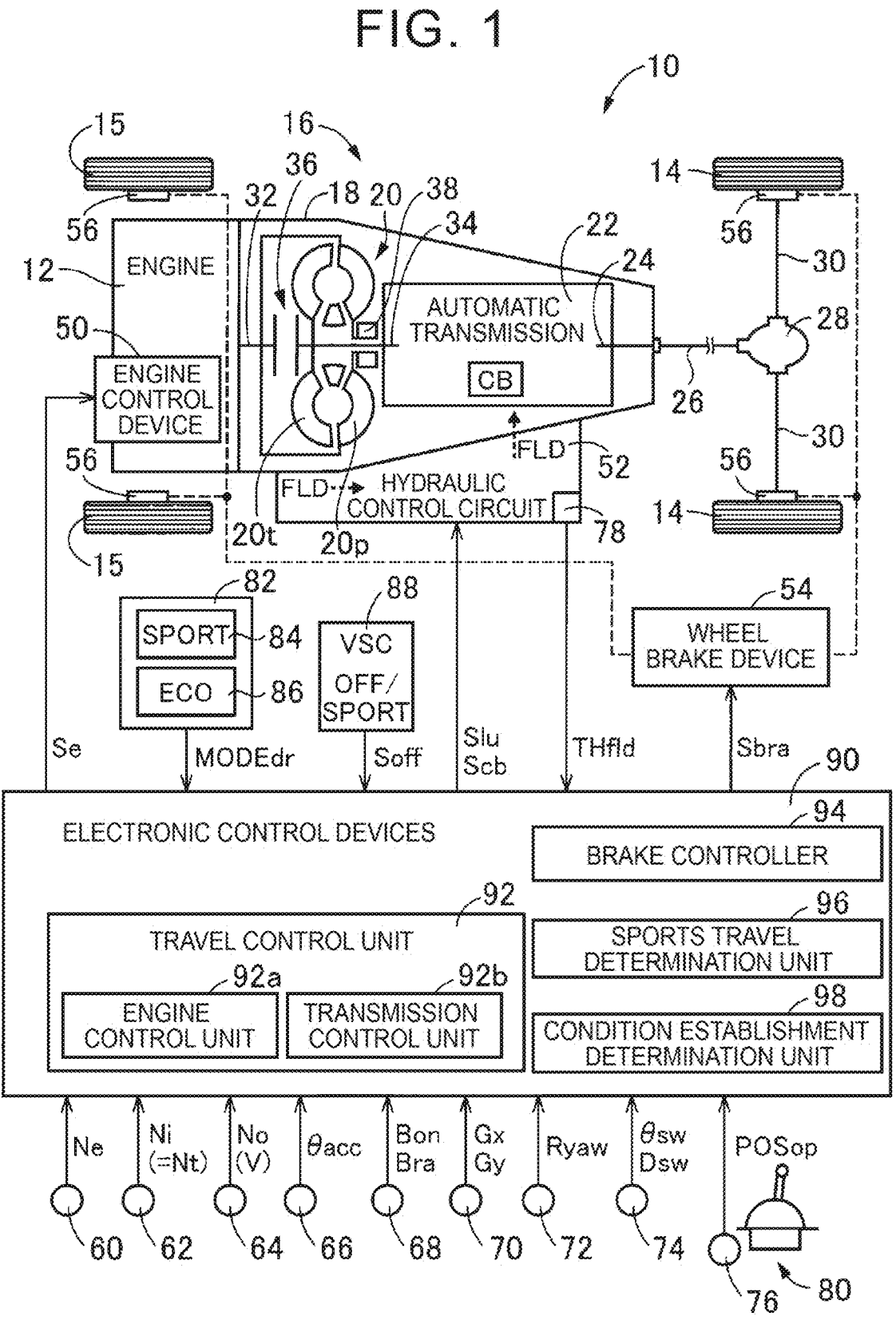
FIG. 1 is a diagram for explaining a schematic configuration of a vehicle to which the present disclosure is applied, and is a diagram for explaining a control function for various kinds of control in a vehicle and a main part of a control system.

FIG. 1 is a diagram for explaining a schematic configuration of a vehicle 10 to which the present disclosure is applied, and is a diagram for explaining main parts of a control function and a control system for various kinds of control in the vehicle 10. In FIG. 1, a vehicle 10 includes an engine 12 as a power source, drive wheels 14, and a power transmission device 16 provided in a power transmission path between the engine 12 and the drive wheels 14.

The engine 12 is a known internal combustion engine. In the engine 12, an engine control device 50 including an electronic throttle valve, a fuel injection device, an ignition device, and the like provided in the vehicle 10 is controlled by an electronic control device 90 to control an engine torque Te which is a torque of the engine 12.

The power transmission device 16 includes a torque converter 20 connected to the engine 12, an automatic transmission 22 connected to the torque converter 20, and the like in a case 18 that is a non-rotating member attached to the vehicle body. The power transmission device 16 includes a propeller shaft 26 connected to the transmission output shaft 24, a differential gear 28 connected to the propeller shaft 26, a pair of drive shafts 30 connected to the differential gear 28, and the like. The transmission output shaft 24 is an output rotation member of the automatic transmission 22. The power transmission device 16 includes an engine coupling shaft 32 and the like that couple the engine 12 and the torque converter 20.

The torque converter 20 is a known fluid transmission. The torque converter 20 includes a pump impeller 20$p$ coupled to an engine-coupling shaft 32 and a turbine impeller 20$t$ coupled to a transmission-input shaft 34. The transmission input shaft 34 is an input rotating member of the automatic transmission 22.

The torque converter 20 includes a LU clutch 36 as a direct coupling clutch that couples the engine-coupling shaft 32 and the transmission-input shaft 34. LU clutch 36 is a known lock-up clutch, for example, a hydraulic frictional engagement device. In LU clutch 36, PRlu of LU hydraulic pressure changes Tlu of LU torque, which is the torque capacity of the LU clutch 36, so that an operating state, that is, a control state, such as an engaged state, a slipped state, and a released state, is switched. LU hydraulic pressure PRlu is the hydraulic pressure of the regulated oil FLD supplied from the hydraulic control circuit 52 provided in the vehicles 10 to LU clutches 36. The oil FLD is hydraulic oil used for a shift operation of the automatic transmission 22, a switching operation of LU clutch 36, and the like.

The automatic transmission 22 is a known planetary gear type automatic transmission including, for example, one or a plurality of sets of planetary gears (not shown) and an engagement device CB. The engagement device CB is a known hydraulic frictional engagement device including a plurality of engagement devices such as clutches and brakes. In the engagement device CB, the engagement hydraulic PRcb changes the engagement torque Tcb, which is the torque capacitance of the engagement device CB, so that the control states such as the engagement state, the slipping state, and the release state are switched. The engagement hydraulic PRcb is the hydraulic pressure of the regulated oil FLD supplied from the hydraulic control circuit 52 to the engagement device CB.

The automatic transmission 22 is a stepped transmission in which any one of a plurality of gear stages (also referred to as gear stage GS) having different gear ratio (also referred to as gear ratio) γat (=Ni/No) is formed by engagement of any one of the engagement device CB. "Ni" is the rotational speed of the transmission input shaft 34, and is the input rotational speed of the automatic transmission 22, that is, the transmission input rotational speed Ni. "No" is the rotational speed of the transmission output shaft 24, and is the output rotational speed of the automatic transmission 22, that is, the transmission output rotational speed No.

In the automatic transmission 22, the control status of the engagement device CB is switched according to the accelerator operation of the driver (=driver), the vehicle speed V, and the like by the electronic control device 90, which will be described later, so that the gear stage GS to be formed is switched. In the shift operation of the automatic transmission 22, for example, a so-called clutch-to-clutch shift is executed in which the shift is advanced by the engagement of the engagement-side engagement device while the release-side engagement device is released. The release-side engagement device is an engagement device that is engaged before the transmission of the automatic transmission 22 among the engagement devices involved in the transmission, and is a release-side engagement device that is controlled from the engagement state toward the release state in the shift transient of the automatic transmission 22. The engagement-side engagement device is an engagement-side engagement device that has been released before the transmission of the automatic transmission 22 among the engagement devices involved in the transmission, and is controlled from the release state toward the engagement state in the shift transient of the automatic transmission 22.

Vehicle 10 includes a mechanical oil pump 38 coupled to a pump impeller 20$p$. The oil pump 38 is rotationally driven by the engine 12 to discharge oil FLD used in the power transmission device 16. The oil FLD discharged from the oil pump 38 is supplied to the hydraulic pressure control circuit 52. The hydraulic control circuit 52 supplies a LU hydraulic pressure PRlu adjusted based on the oil FLD from the oil pump 38, various engagement hydraulic PRcb, and the like.

The vehicle 10 includes a wheel brake device 54. The wheel brake device 54 includes a brake master cylinder, a cylinder actuator, and the like that generate brake hydraulic pressure (not shown). The wheel WH including the drive wheels 14 and the driven wheels 15 each comprise a wheel brake 56. When the vehicle 10 is an all-wheel drive vehicle, the driven wheels are drive wheels. The wheel brake device 54 is a brake device that applies a wheel braking torque Tb, which is a braking torque generated by the wheel brake 56, to the wheel WH in accordance with a command from an electronic control device 90 described later. The wheel brake device 54 supplies brake hydraulic pressure to wheel cylinders (not shown) respectively provided on the wheel brakes 56 in response to, for example, a depression operation of the brake pedal by the driver. In the wheel brake device 54, the master cylinder hydraulic pressure generated from the brake master cylinder and having a size corresponding to the brake operating amount Bra is supplied to the wheel cylinder as the brake hydraulic pressure in a normal state. The brake operating amount Bra is a signal representing a magnitude of the depression operation of the brake pedal by the driver, that is, a magnitude of the brake operation, corresponding to the depression force of the brake pedal. On the other hand, in the wheel brake device 54, for example, when VSC or the automatic brake control is operated, a brake hydraulic pressure having a magnitude corresponding to the wheel braking torque Tb required for the respective controls is supplied to the wheel cylinder in order to generate the wheel braking torque Tb.

VSC (VehicleStabilityControl) is a known sideslip control. In VSC, the wheel braking torque Tb and the drive torque Td in each of the wheel WH are controlled so as to suppress the rear wheel slip or the front wheel slip in order to ensure the rotational stability of the vehicle 10.

The vehicle 10 further includes an electronic control device 90 as a controller including a control device for the vehicle 10 related to control of the engine 12 and the automatic transmission 22. The electronic control device 90 includes, for example, a so-called microcomputer including a CPU, RAM, ROM, an input/output interface, and the like. CPU performs various kinds of control of the vehicles 10 by performing signal-processing in accordance with a program stored in ROM in advance using, for example, a temporary storage function of RAM. The electronic control device 90 includes computers for engine control, hydraulic control, brake control, and the like as necessary.

Various signals and the like based on detection values by various sensors and the like provided in the vehicle 10 are supplied to the electronic control device 90. Examples of the various sensors include an engine rotation speed sensor 60, an input rotation speed sensor 62, an output rotation speed sensor 64, an accelerator operation amount sensor 66, a brake sensor 68, an acceleration sensor 70, a yaw rate sensor 72, a steering sensor 74, an operation position sensor 76, and an oil temperature sensor 78. Various signals and the like are, for example, an engine rotational speed Ne, a transmission input rotational speed Ni, a transmission output rotational speed No, an accelerator operation amount θacc, a brake-on signal Bon, a brake operating amount Bra, a longitudinal acceleration Gx, lateral acceleration Gy, a yaw rate Ryaw, a steering angle θsw, a steering direction Dsw, an operating position POSop, an oil temperature THfld, and the like.

The engine rotational speed Ne is the rotational speed of the engine 12. The transmission-input rotational speed Ni is equal to the turbine rotational speed Nt, which is the rotational speed of the turbine impeller 20t. The transmission-output rotational speed No is a rotational speed corresponding to the vehicle speed V. The accelerator operation amount θacc is an accelerator operation amount of the driver representing a magnitude of the acceleration operation of the driver. The brake-on signal Bon is a signal indicating that a brake pedal for operating the wheel brake 56 is being operated by the driver. The yaw rate Ryaw is a rotational angular velocity around the vertical axis of the vehicle 10. The steering angle θsw is a steering angle of a steering wheel (not shown) provided in the vehicle 10. The steering direction Dsw is a steering direction of the steering wheel. The oil temperature THfld is the temperature of the oil FLD.

The vehicle 10 includes a shift device 80 having a shift operating member that is operated by a driver to any one of a plurality of operating positions POSop. The shift device 80 is a switching device for switching the shift position (the shift range Rsh is also agreed) of the automatic transmission 22. The operating position POSop is a signal indicating a selected state of the power transmission state in the automatic transmission 22, and includes, for example, P, R, N, D operating positions, and the like. The shift range Rsh indicates the power transmission status of the automatic transmission 22, and includes, for example, P, R, N, and D ranges.

The P (parking) operating position represents a selected state of the P range of the automatic transmission 22 in which the automatic transmission 22 is in a neutral state and the transmission output shaft 24 is mechanically fixed in a non-rotatable manner. The neutral state of the automatic transmission 22 is a power transmission disabled state in which no gear stage GS is formed. The R (backward traveling) operation position represents a selected state of the R range of the automatic transmission 22 that enables backward traveling. The N (neutral) operating position represents a selected state of the N range of the automatic transmission 22 in which the automatic transmission 22 is in the neutral state. The D (forward travel) operation position represents a selected state of the D range of the automatic transmission 22 that enables forward travel by executing automatic shift control of the automatic transmission 22. The D range of the automatic transmission 22 is the forward travel position of the automatic transmission 22 (the forward travel range is also agreed).

The vehicle 10 further includes a mode selection switch 82. The mode selection switch 82 is a switch operated by a driver to set the drive mode MODEdr of the vehicles 10. The drive mode MODEdr includes, for example, a normal mode, a sporting mode (i.e., a power mode), and an eco-mode. The normal mode is a predetermined driving mode in which driving is performed so as to be able to operate in an energy-efficient state while power performance is extracted. The sport mode is a predetermined driving mode in which the vehicle travels in such a manner that the vehicle can be driven in a state in which the power performance is prioritized over the energy efficiency as compared with the normal mode. The eco mode is a predetermined driving mode in which the vehicle travels in such a manner that the vehicle can be operated in a state in which energy efficiency is prioritized over the power performance as compared with the normal mode.

The mode selection switch 82 includes a sports mode switch 84 and an eco-mode switch 86 for switching the drive mode MODEdr. The sports mode switch 84 is a switch for setting a sport mode as the drive mode MODEdr. The eco mode switch 86 is a switch for setting the eco mode as the drive mode MODEdr. The electronic control device 90 is supplied with the driving mode MODEdr detected by the mode selection switch 82. When neither the sports mode switch 84 nor the eco-mode switch 86 is operated, the normal mode is set as the drive mode MODEdr.

The vehicle 10 further includes a VSC release switch 88. VSC release switch 88 is a switch operated by a driver to limit the operation of VSC. The modes for limiting the operation of VSC include, for example, a VSC off mode in which VSC is basically deactivated in normal running, and a VSC sports running mode in which VSC is basically deactivated in sports running. For example, each time VSC release switch 88 is operated, a release operation signal Soff is supplied to the electronic control device 90. Accordingly, VSC mode is switched between VSC off mode, VSC sports mode, and VSC on mode in which VSC is activated in response to the actuation of the VSC release switch 88. The sports travel is a vehicle travel in which the vehicle 10 is caused to travel in a sideslip state at the time of turning, and is also referred to as drift travel. In addition, "basically" means, for example, except when it is necessary to operate for safety.

Various command signals and the like are output from the electronic control device 90 to each device and the like provided in the vehicle 10. Each of the devices is, for example, an engine control device 50, a hydraulic control circuit 52, a wheel brake device 54, or the like. Examples of the various command signals include an engine control command signal Se, an engagement hydraulic control command signal Scb, LU hydraulic control command signal Slu, and a braking control command signal Sbra. The engine control command signal Se is a command signal for controlling the engine 12. The engagement hydraulic control command signal Scb is a command signal for controlling the engagement device CB, and is an instruction hydraulic pressure of the engagement hydraulic PRcb. LU hydraulic control command signal Slu is a command signal for controlling LU clutch 36, and is an instruction hydraulic pressure of LU hydraulic pressure PRlu. The braking control command signal Sbra is a command signal for controlling the wheel braking torque Tb.

The electronic control device 90 includes a travel control unit 92 and a brake control unit 94 in order to realize various controls in the vehicle 10.

The travel control unit 92 includes an engine control unit 92a that controls the engine 12, and a transmission control unit 92b that controls the transmission of the automatic transmission 22.

For example, the engine control unit 92a calculates a drive request amount for the vehicle 10 by the driver by applying the accelerator operation amount θacc and the vehicle speed V to a drive request amount map obtained experimentally or designedly, that is, predetermined. The drive requirement is, for example, a required drive torque Tddem in the drive wheels 14. The engine control unit 92*a* outputs an engine control command signal Se for controlling the engine 12 so as to obtain a required engine torque Tedem for realizing a required drive torque Tddem calculated by taking into account transmission loss, auxiliary load, gear ratio γat, and the like. The engine control unit 92*a* outputs an engine control command signal Se for controlling the engine 12 so as to obtain a required engine torque Tedem that realizes a required drive torque Tddem required for the respective controls when VSC is operated.

The transmission control unit 92*b* determines the shift of the automatic transmission 22 using, for example, a predetermined shift map, and outputs an engagement hydraulic control command signal Scb for executing the shift control of the automatic transmission 22 to the hydraulic control circuit 52 according to the shift determination.

The brake control unit 94 controls the wheel brake device 54. The brake control unit 94 outputs a brake control command Sbra for generating a wheel braking torque Tb corresponding to the brake operating amount Bra. The brake control unit 94 outputs a brake control command Sbra for generating a wheel braking torque Tb required for the respective controls when VSC or the automated brake control is operated.

When the vehicle speed V and the engine rotational speed Ne are lowered to the low range during the drift travel in the D range, there is a possibility that the downshift of the automatic transmission 22 is not determined and the downshift is not performed in the shift determination using the shift map. As a result, the drive wheels 14 may be gripped due to insufficient drive torque Td due to a decrease in the engine rotational speed Ne during the drift travel in which the accelerator operation is repeatedly turned on and off, and thus the drift travel attitude may not be maintained successfully. Alternatively, after the turning, the engine rotational speed Ne is accelerated from a reduced condition, and thus the re-acceleration may be slowed. When drifting in the D range, it is desirable to maintain the gear stage GS at the low vehicle speed in order to successfully turn the corners and ensure the acceleration responsiveness of the rising. The gear stage GS at the low vehicle speed is a low gear stage GSlow in which the gear ratio γat is relatively large.

Therefore, the electronic control device 90 performs the downshift of the automatic transmission 22 when a decrease in the vehicle speed V is detected during the drift travel in the D range. The electronic control device 90 can prevent a decrease in running performance by turning while keeping the engine rotational speed Ne in a high range. At this time, for example, when VSC is operated while traveling on a slippery road such as a snowy road, it is not desired to perform a downshift. The electronic control device 90 is limited to a case where the operation of VSC is restricted, and thereby achieves compatibility with driving other than motor sports, for example. Therefore, the electronic control device 90 further includes a sports travel determination unit 96 and a condition establishment determination unit 98.

The sports travel determination unit 96 determines whether or not the sport traveling, that is, the drift traveling is being performed. The sports travel determination unit 96 functions as a drift travel determination unit. The sports travel determination unit 96 determines whether or not the drift traveling is being performed based on whether or not any of the oversteer state, the understeer state, the counter steer state, and the vehicle counter state is being performed. The drift travel determined by the sports travel determination unit 96 is a drift travel in a broad sense including an oversteer state, an understeer state, a counter steer state, and a vehicle counter state. The counter steering state is a state in which the steering wheel is operated in a direction opposite to the left and right directions in the turning direction of the vehicle 10, and is a state of drift traveling in a narrow sense. The vehicle counter state is a state in which the vehicle 10 slides sideways when the vehicle 10 is returned from the counter steer state to the straight traveling state. The sports travel determination unit 96 determines whether or not the vehicle is in any one of an oversteer state, an understeer state, a counter steer state, and a vehicle counter state, based on, for example, lateral acceleration Gy, a yaw rate Ryaw, a steering angle θsw, a steering direction Dsw, and the like.

The condition establishment determination unit 98 determines whether or not the permission condition Cp is satisfied. The permission condition Cp is a prerequisite for permitting the downshift of the automatic transmission 22 during the drift travel in the D range. The permission condition Cp includes a condition in which the vehicle speed V is less than the predetermined vehicle speed Vf and the operation of VSC is restricted.

The predetermined vehicle speed Vf is, for example, a lower limit of a predetermined vehicle speed V capable of generating an engine torque Te for realizing a drive torque Td required for executing the drift travel. The engine 12 has, for example, a torque band that is an area of the engine rotational speed Ne in which the engine torque Te is likely to be generated. The predetermined vehicle speed Vf is a vehicle speed V corresponding to the lower limit of the range of the engine rotational speed Ne in the torque band. The fact that the vehicle speed V is less than the predetermined vehicle speed Vf is synonymous with the fact that the transmission output rotational speed No is less than the predetermined output rotational speed Nof. The predetermined-output rotational speed Nof is a predetermined threshold corresponding to the predetermined vehicle speed Vf. The predetermined vehicle speed Vf and the predetermined output rotational speed Nof are also values for preventing the engine rotational speed Ne from exceeding the allowable rotational speed after the downshift of the automatic transmission 22, for example.

The state in which the operation of VSC is restricted is a state in which the mode of VSC is set to VSC off mode or VSC sporting mode by operating the release switch 88.

The transmission control unit 92*b* determines whether or not the shift range Rsh of the automatic transmission 22 is the D range. When the shift range Rsh is determined to be in the D range, the transmission control unit 92*b* performs a downshift of the automatic transmission 22 when the sports travel determination unit 96 determines that the drift travel is being performed and the condition establishment determination unit 98 determines that the permission condition Cp is satisfied. As described above, in addition to determining the downshift of the automatic transmission 22 using the shift map, the travel control unit 92 determines the downshift of the automatic transmission 22 based on the engine rotational speed Ne (the vehicle speed V and the transmission output rotational speed No are also synonymous).

The transmission control unit 92*b* performs the downshift of the automatic transmission 22 during the drift travel in the blipping downshift instead of the clutch-to-clutch shift. The blipping downshift is a downshift in which the engagement-side engagement device is engaged after the transmission-input rotational speed Ni is raised toward the synchronous rotational speed (=γata×No) after the downshift by the engine torque Te with the release-side engagement device released. "γata" is the gear ratio γat in the gear stage GS after the downshift. The blipping downshift results in a shorter shift transient time compared to a clutch-to-clutch shift.

Blipping downshifts may not be adequately performed in areas where the oil temperature THfld is lower. Alternatively, the blipping downshift is a control to raise a transmission-input rotational-speed Ni, which cannot be raised in a neutral condition in which the release-side engagement device is released, by an engine torque Te. That is, the blipping downshift is performed by increasing the engine torque Te in a relatively small area regardless of the accelerator operation amount θacc. In other words, in the blipping downshift, if the engine torque Te is originally large, there is a possibility that the transmission-input rotational speed Ni cannot be appropriately increased toward the synchronized rotational speed after the downshift. Therefore, the permission condition Cp may further include at least one of the following: the oil temperature THfld is equal to or higher than the lower limit oil temperature THfldf; and the accelerator operation amount θacc is equal to or lower than the upper limit accelerator operation amount θaccf. The lower limit oil temperature THfldf is, for example, a predetermined threshold that allows blipping downshift to be performed. The upper limit accelerator operation amount θaccf is, for example, a predetermined upper limit accelerator operation amount that enables transient control of a blipping downshift.

In view of the drivability, a situation in which the acceleration responsiveness is preferably secured is, for example, a situation in which the driving mode MODEdr of the vehicles 10 is set to the sporting mode by the mode selection switch 82. Therefore, the permission condition Cp may further include that the driving mode MODEdr set in the vehicles 10 is the sporting mode.

Figure 2:
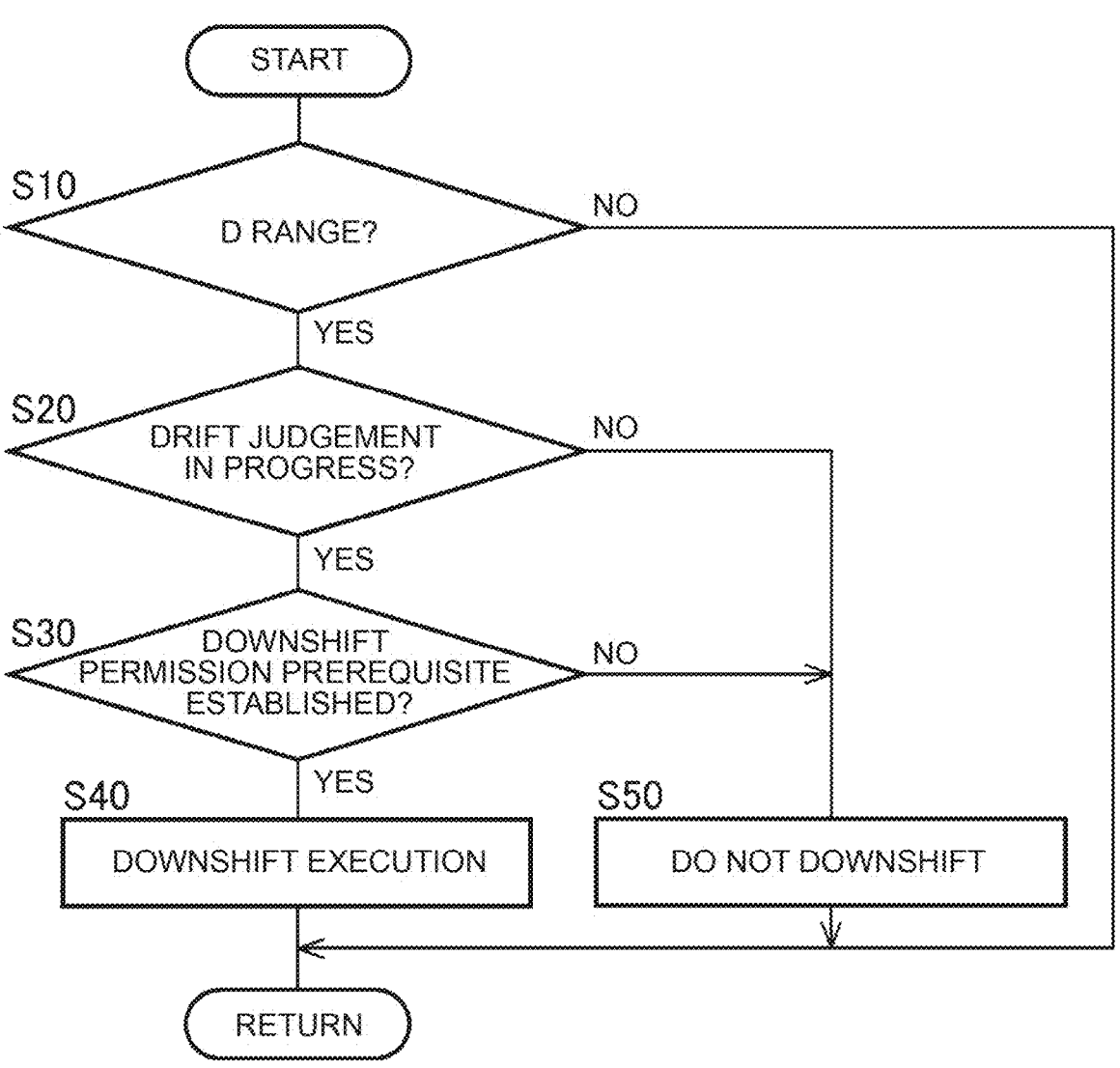
FIG. 2 is a flow chart for explaining a main part of a control operation of the electronic control device, and is a flow chart for explaining a control operation for facilitating securing a driving torque while suppressing an unnecessary downshift when the drift travel is executed.

FIG. 2 is a flowchart for explaining a main part of a control operation of the electronic control device 90, and is a flowchart for explaining a control operation for facilitating securing a drive torque Td while suppressing an unnecessary downshift when the drift travel is executed, and is repeatedly executed, for example.

In FIG. 2, first, in a step (hereinafter, step is omitted) S10 corresponding to the function of the transmission control unit 92b, it is determined whether or not the shift range Rsh is the D range. If the determination of this S10 is negative, the routine is terminated. When the determination of S10 is affirmative, it is determined whether or not the drifting is being performed in S20 corresponding to the function of the sports travel determination unit 96. When the determination of S20 is affirmative, it is determined whether or not the permission condition Cp is satisfied in S30 corresponding to the function of the condition establishment determination unit 98. When the determination of S30 is affirmative, the downshift of the automatic transmission 22 is performed in S40 corresponding to the function of the transmission control unit 92b. When the determination of S20 is negative, or when the determination of S30 is negative, the downshift of the automatic transmission 22 is not performed in S50 corresponding to the function of the transmission control unit 92b.

Figure 3:
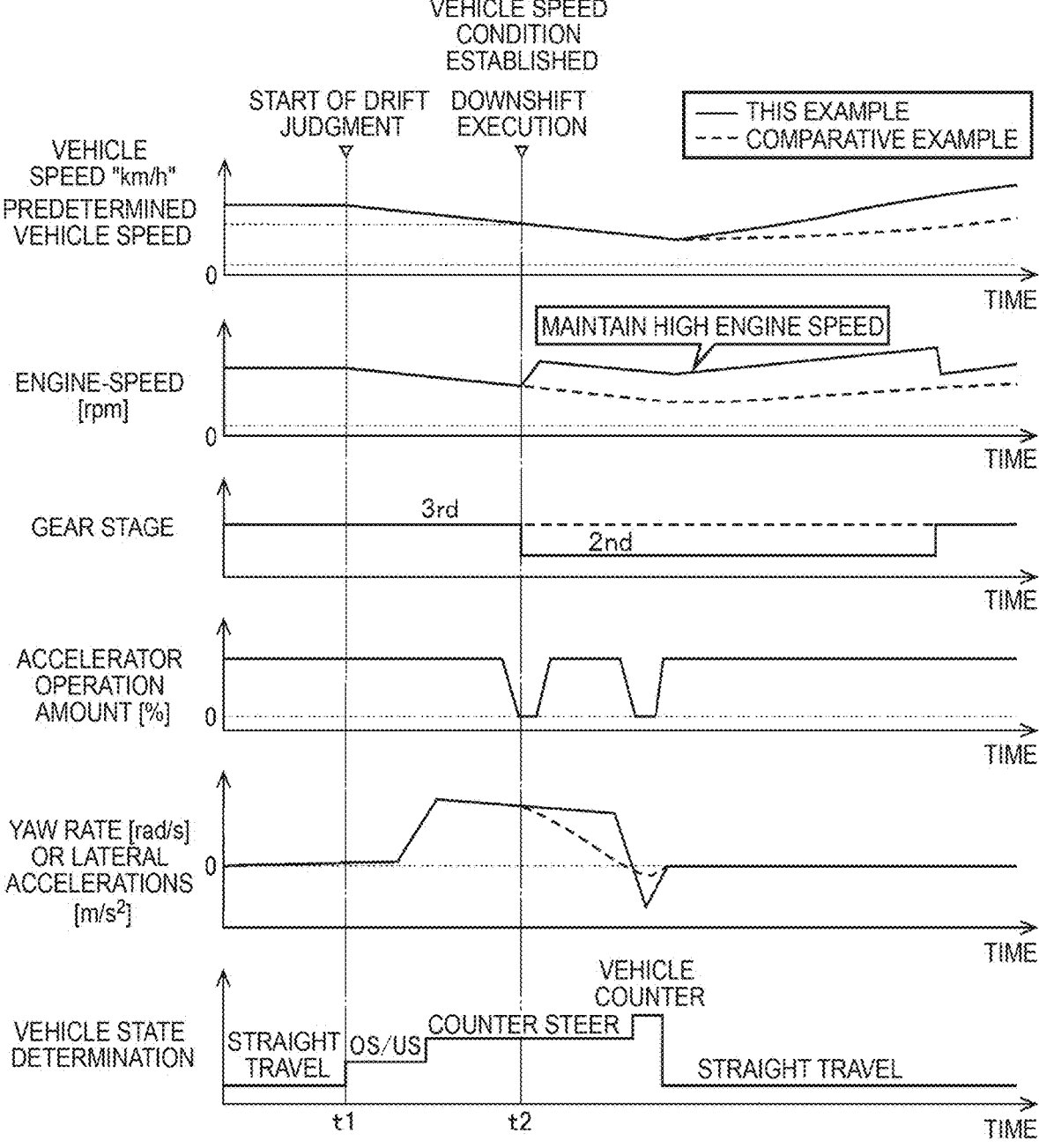
FIG. 3 is a diagram illustrating an example of a time chart when the control operation illustrated in the flowchart of FIG. 2 is executed.

FIG. 3 is a diagram illustrating an example of a time chart when the control operation illustrated in the flowchart of FIG. 2 is executed. FIG. 3 shows an exemplary case where the vehicle is traveling in VSC off mode or VSC sporting mode in the D range. In FIG. 3, t1 time point indicates a time point at which the determination that the vehicle is drifting is started. When the vehicle speed V is set to be less than the predetermined vehicle speed Vf during the drift-running, the downshift of the automatic transmission 22 is executed (see t2 time point). In the comparative example shown by the broken line, since the downshift is not executed during the execution of the drift travel, the engine torque Te is set to the low range (refer to t2 time point and later), and the attitude of the drift travel is not properly maintained (refer to the yaw rate Ryaw or the lateral acceleration Gy). Further, the acceleration response after turning is not good. On the other hand, in the present embodiment shown by the solid line, the engine torque Te is maintained in the high range by the downshift (refer to t2 time point and later), and the driving attitude of the drifting vehicle is successfully maintained (refer to the yaw rate Ryaw or the lateral acceleration Gy). Further, the acceleration response after turning is improved.

As described above, according to the present embodiment, when the shift range Rsh is in the D range, it is determined that the drift traveling is being performed, and when it is determined that the permission condition Cp is satisfied, the automatic transmission 22 is downshifted. Accordingly, downshifting is performed during drifting, the engine rotational speed Ne is maintained in a high range, and the drive torque Td is easily secured. In addition, the present disclosure is limited to cases where the permission condition Cp is satisfied, and therefore, for example, a downshift is not executed when VSC is in operation. In other words, since the operation of VSC is limited, unnecessary downshifts are not performed at the time of slipping (synonymous with VSC operation) other than in the drifting travel, and thus it is easy to achieve compatibility with the normal travel. Therefore, it is possible to easily secure the drive torque Td while suppressing an unnecessary downshift when the drift travel is executed. During drifting, the engine rotational speed Ne is maintained at a high frequency, which facilitates controlling the attitude of the vehicle. In addition, the acceleration performance of the rising edge after the turning is improved.

In addition, according to the present embodiment, the predetermined vehicle speed Vf is a lower limit of a predetermined vehicle speed V that can generate an engine torque Te for realizing a drive torque Td required for executing the drift travel. Accordingly, downshifting is performed during drifting, the engine rotational speed Ne is maintained in a high range, and the drive torque Td is easily secured.

Further, according to the present embodiment, the downshift of the automatic transmission 22 during the execution of the drift travel is a blipping downshift. As a result, the shift transient is shorter than that of the clutch-to-clutch shift, and the engine rotational speed Ne is quickly maintained at a high frequency.

Further, according to the present embodiment, the permission condition Cp may further include at least one of the following: the oil temperature THfld is equal to or higher than the lower limit oil temperature THfldf; and the accelerator operation amount θacc is equal to or lower than the upper limit accelerator operation amount θaccf. As a result, the blipping down-shift of the automatic transmission 22 during the drift travel is appropriately performed.

Further, according to the present embodiment, the permission condition Cp may further include that the driving mode MODEdr set in the vehicles 10 is the sporting mode. Thus, drivability is improved by improving acceleration responsiveness.

Although the embodiments of the disclosure have been described in detail with reference to the drawings, the disclosure is also applicable to other modes.

For example, in the above-described embodiment, the engine 12 is exemplified as a power source, but the present disclosure is not limited to this embodiment. For example, an electric motor may be used as the power source in addition to or instead of the engine 12.

Further, in the above-described embodiment, the downshift of the automatic transmission 22 during the execution of the drift traveling may not be a blipping downshift, and may be a downshift due to a clutch-to-clutch shift. Even in this way, a certain effect of the present disclosure is obtained.

In the above-described embodiment, a planetary gear-type stepped transmission is exemplified as the automatic transmission 22, but the present disclosure is not limited to this embodiment. For example, except for the control related to the blipping downshift, the automatic transmission 22 may be a synchronous meshing type parallel-biaxial type automatic transmission including a known DCT (Dual Clutch Transmission), a known continuously variable transmission such as a belt-type, a known electric continuously variable transmission, or the like. In the case of a continuously variable transmission, for example, a stepped gear stage may be formed.

In the above-described embodiment, the driving mode MODEdr may include, for example, a drift mode which is a predetermined driving mode for performing driving so as to be able to drive the vehicle 10 in a state in which the vehicle is easily slid during turning. This drift mode is a driving mode suitable for drift traveling, which is a traveling in which the vehicle 10 is slid sideways during turning. The permission condition Cp may further include that the driving mode MODEdr set in the vehicles 10 is the drift mode. Accordingly, the drivability is improved by keeping the vehicle attitude of the drift traveling well.

The above description is merely an example, and the disclosure can be implemented in various modified and improved modes based on the knowledge of those skilled in the art.

What is claimed is:

1. A control device for a vehicle including a power source and an automatic transmission provided in a power transfer path between the power source and drive wheels, comprising:

a sports travel determination unit that determines whether sports travel in which the vehicle is caused to travel in a sideslip state during a turn is being executed;

a condition establishment determination unit that determines whether a permission condition that a vehicle speed is less than a predetermined vehicle speed and that operation of sideslip suppression control is restricted is established; and a transmission control unit that executes a downshift of the automatic transmission when a shift position of the automatic transmission is a forward travel position that enables forward travel by executing automatic shift control, and it is determined that when the sports travel is being executed and it is determined that the permission condition is established.

2. The control device according to claim 1, wherein the predetermined vehicle speed is a lower limit value of the vehicle speed determined in advance at which it is possible to generate torque of the power source that achieves drive torque necessary to execute the sports travel.

3. The control device according to claim 1, wherein:

the automatic transmission is a stepped transmission in which any of a plurality of gear stages is formed by engagement of any of a plurality of engagement devices; and the downshift is a blipping downshift in which a rotational speed input to the stepped transmission is increased by torque of the power source toward a synchronous rotational speed after the downshift with the engagement device on a disengaged side disengaged, and thereafter the engagement device on an engagement side is engaged.

4. The control device according to claim 3, wherein the permission condition further includes at least one of:

a temperature of hydraulic oil that is used for shift operation of the automatic transmission being equal to or higher than a lower limit oil temperature determined in advance at which it is possible to perform the blipping downshift; and an accelerator operation amount being equal to or less than an upper limit accelerator operation amount determined in advance at which it is possible to perform transient control of the blipping downshift.

5. The control device according to claim 1, wherein the permission condition further includes a drive mode set in the vehicle being a sports mode in which it is possible to drive the vehicle in a state in which priority is given to power performance over energy efficiency.

* * * * *